July 26, 1960

C. DURNER 2,946,485

SAFETY BRAKE SETTING DEVICE FOR VEHICLES

Filed July 24, 1958

INVENTOR
Carl Durner
BY Alex. E. MacRae
ATTORNEY

United States Patent Office 2,946,485
Patented July 26, 1960

2,946,485

SAFETY BRAKE SETTING DEVICE FOR VEHICLES

Carl Durner, 37 Garnet Ave., Toronto, Ontario, Canada

Filed July 24, 1958, Ser. No. 750,759

1 Claim. (Cl. 222—30)

This invention relates to safety devices for automatically setting vehicle brakes.

The operators of delivery motor vehicles must frequently leave such vehicles unattended. Should the brakes of such a vehicle be not properly applied, the possibility of an unattended runaway vehicle creates a great hazard. When such a vehicle is an oil delivery tank truck, the hazard is greatly increased not only because of the great weight and bulk of the vehicle and its contents but because of the fact that the hazard is multiplied many times as a result of the vast increase in domestic and commercial fuel oil consumption in recent years.

It is an object of this invention to provide a simple and inexpensive device for ensuring adequate setting of brakes in vehicles in response to metered delivery of the substance carried by the vehicle, such device being positive in operation and capable of convenient installation.

The invention resides, in combination with a vehicle having a meter thereon for metering of a substance delivered thereby, in the provision of a device comprising means for actuating such brakes including a servo motor, a vacuum line leading to said motor, a valve for controlling said line, and means for operating said valve in response to a function of said meter.

Figure 1:
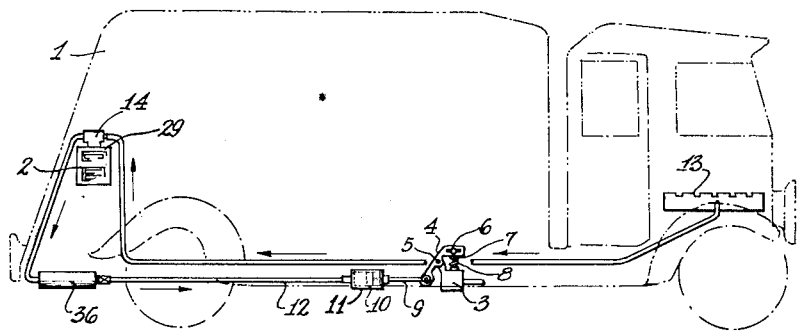
Figures 2, 3:
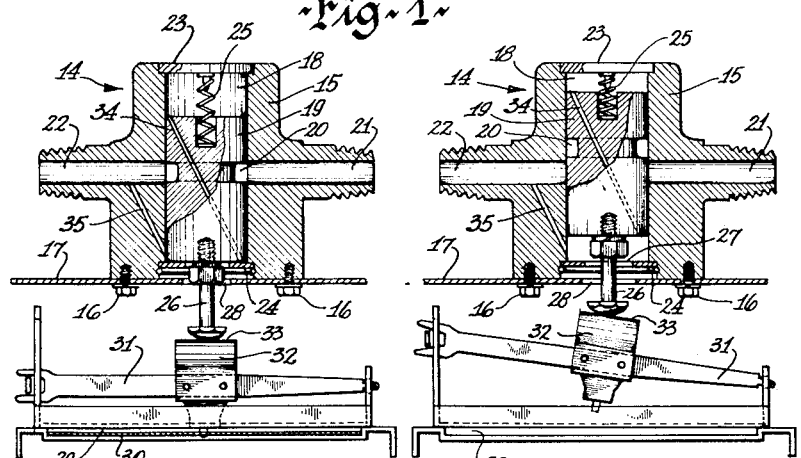
Figure 4:
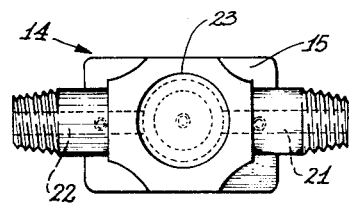

The invention will be described with reference to the accompanying drawing, in which Figure 1 is a side elevation of the device as installed on a motor vehicle, Figure 2 is a sectional elevation of a valve and operating means therefor, Figure 3 is a sectional elevation of the mechanism shown in Figure 2 in another operating position, and Figure 4 is a plan view of the valve shown in Figures 2 and 3.

In the drawing, 1 is a motor vehicle such as an oil delivery truck having a meter 2 for metering the quantity of oil delivered at each specific location. The conventional valve for controlling actuation of the hydraulic brakes of such vehicle is indicated at 3.

Means for actuating the brake control valve 3 independently of the conventional brake applying means (not shown) comprises a lever 4 pivoted at 5 to the valve body having a slotted connection 6 with the valve actuating plunger 7 which is normally maintained in brake release position by a spring 8. A connecting rod 9 of the piston 10 of a servo motor 11 is pivotally connected to the lever 4. It will be apparent that movement of the piston to left (as viewed in Figure 1) will cause the lever to depress the plunger 7 into brake applying position whereas movement of the piston to the right will cause the lever to release the plunger for return to brake released position.

The end of the servo motor remote from the connecting rod 9 is connected through a vacuum line 12 to the intake manifold 13 of the vehicle engine.

Interposed in vacuum line 12 is a control valve 14 which is preferably mounted upon the top of the meter 2.

Valve 14 comprises a body 15 fixed as by screws 16 to the meter casing 17. The valve has an upright cylindrical chamber 18 in which is reciprocally mounted a valve spool 19 having an annular recess 20 adapted to register in one position of the spool, with passages 21 and 22 communicating with the vacuum line 12. The upper end of chamber 18 is provided with a cover plate 23 and the lower end with a cover plate 24. A spring 25, interposed between the top of spool 19 and cover plate 23, urges the spool downwardly into seating engagement with cover plate 24, in which position the recess 20 connects passages 21 and 22 to place the servo motor in communication with the manifold 13. It will be apparent that, under such circumstances, the piston 10 of the servo motor will move to the left under the influence of vacuum to depress plunger 7 and thus apply the brakes of the vehicle.

Valve spool 19 has an axial pin 26 projecting from its lower end and extending through opening 27 on cover plate 24 and opening 28 in meter casing 17 into the interior of the casing.

The meter 2 includes the usual slot 29 in the forward wall thereof for reception of a delivery card or slip 30 upon which the quantity of oil delivered is printed by the meter mechanism all in conventional manner. The meter also includes the usual card holding lever 31 depression of which to the position shown in Figure 2 places the meter in operating condition and raising of which interrupts operation of the meter.

In accordance with the invention, an upwardly projecting strip 32 of metal or the like is fixed to lever 31 to provide a bearing surface 33 upon which the end of pin 26 bears. It will be apparent that, when the lever 31 is depressed, i.e., when the meter is in metering operation, the valve spool 19 will be in lower position to place the servo motor in communication with the manifold 13 to actuate the vehicle brakes. When, however, the lever is raised, as shown in Figure 3, to place the meter in non-operating position when no delivery is being made, the spool 19 will also be raised by means of pin 26 to interrupt vacuum line 12 and cause the brakes to be released.

Free reciprocation of the valve spool 19 is ensured by providing an air by pass passage 34 extending from end to end of the spool and an air by pass passage 35 extending from the lower end of chamber 18 to passage 22. A reservoir tank 36 may be provided in the vacuum line between the valve 14 and servo motor 11.

It will be apparent, therefore, that when the operator of the vehicle stops the same to make a delivery and inserts a delivery slip into the meter (this being the initial step in the delivery procedure) the vehicle brakes will be automatically applied and will remain so until the delivery slip is removed from the meter (this being the final step in the delivery procedure). Thus, there is no possibility of a runaway vehicle during the time it is left unattended while the operator is carrying out incidental operations during the delivery procedure.

The invention also results in a very important safeguard against accidental or fraudulent misuse of the delivery slips. Thus, no movement of the vehicle is possible after insertion of a delivery slip and any delivery made thereon must be made at one location only.

I claim:

In a fluid dispensing motor vehicle, a brake control valve and a meter for metering a substance delivered thereby, said meter having a casing and a delivery slip holding arm which is pivoted for movement between a raised position in which the meter is inoperative and a lowered position in which the meter is operative, a device for actuating said brake control valve in response to operation of said meter comprising a lever connected to said valve for actuating the same, a servo motor having a reciprocating rod directly connected to said lever to actuate said lever, a vacuum line leading to said servo motor to operate said motor, a valve controlling said vacuum line and having a body fixed to said casing, said body having a cylindrical chamber therein and passages communicating with said vacuum line, a spool reciprocally mounted in said chamber and being movable to one position to place said passages in communication with each other and to a second position to arrest communication between said passages and interrupt said vacuum line, a spring urging said valve into said first position, a pin axially fixed to said spool and projecting into said meter casing, a projection fixed to said delivery slip holding arm and engaging the end of said pin, said pin and spool being reciprocal into said second position in response to movement of said delivery slip holding arm.

References Cited in the file of this patent

UNITED STATES PATENTS

| | | |
|---|---|---|
| 2,364,491 | Triadou | Dec. 5, 1944 |
| 2,707,577 | Trotter et al. | May 3, 1955 |